US005820896A

United States Patent [19]

Wheatley et al.

[11] Patent Number: 5,820,896

[45] Date of Patent: Oct. 13, 1998

[54] METHOD OF MANUFACTURING LAMPSHADES AND APPARATUS FOR PERFORMING THE METHOD

[75] Inventors: Jeremy David Wheatley, St. Albans; Andrew Carl Diamond, Welwyn Garden City; Nicholas Sten Elliott, Hatfield, all of United Kingdom

[73] Assignee: Welwyn Lighting Designs Limited, United Kingdom

[21] Appl. No.: 657,323

[22] Filed: Jun. 3, 1996

[30] Foreign Application Priority Data

Jun. 5, 1995 [GB] United Kingdom .................. 9511326

[51] Int. Cl.[6] .................................................. B29C 53/36

[52] U.S. Cl. ......................... 425/508; 264/249; 264/259; 264/275; 264/295; 264/296; 425/517; 425/520; 425/394; 425/397

[58] Field of Search .................................... 425/517, 520, 425/394, 397, 111, 112, 508, 509; 264/259, 275, 278, 295, 296, 249

[56] References Cited

U.S. PATENT DOCUMENTS

| | | | |
|---|---|---|---|
| 2,859,061 | 11/1958 | Reid . | |
| 3,057,768 | 10/1962 | McGough . | |
| 3,484,518 | 12/1969 | Ignell . | |
| 4,867,929 | 9/1989 | Albrecht et al. . | |
| 4,896,415 | 1/1990 | Bock . | |
| 5,176,607 | 1/1993 | Hill et al. . | |
| 5,472,656 | 12/1995 | Wheatley et al. | 264/295 |
| 5,496,511 | 3/1996 | Juillet . | |
| 5,565,053 | 10/1996 | Happich | 264/295 |
| 5,594,986 | 1/1997 | Frenkel et al. | 264/295 |
| 5,603,800 | 2/1997 | Wheatley et al. . | |
| 5,624,623 | 4/1997 | Luch et al. | 264/296 |

FOREIGN PATENT DOCUMENTS

| | | |
|---|---|---|
| 517195 | 10/1955 | Canada . |
| 0595461 | 4/1994 | European Pat. Off. . |
| 1431002 | 1/1966 | France . |
| 2160786 | 11/1971 | France . |
| 2345661 | 10/1977 | France . |
| 1245721 | 10/1990 | France . |
| 1026254 | 3/1958 | Germany . |
| 3024141 | 1/1982 | Germany . |
| 91100291 | 2/1992 | Germany . |
| 62-11615 | 1/1987 | Japan . |
| 2240388 | 7/1991 | United Kingdom . |

*Primary Examiner*—Jan H. Silbaugh
*Assistant Examiner*—Mark Eashoo
*Attorney, Agent, or Firm*—Webb Ziesenheim Bruening Logsdon Orkin & Hanson, P.C.

[57] ABSTRACT

An apparatus is provided for manufacturing a lampshade from a heat-deformable sheet material. The apparatus includes a first supporting assembly for supporting a hollow body formed from the heat-deformable sheet material, the hollow body having upper and lower peripheral edges. A second supporting assembly is provided for releasably supporting a forming and stiffening ring in peripheral engagement with an interior surface of the hollow body adjacent a peripheral edge of the hollow body so that a marginal edge portion of the hollow body projects beyond the forming and stiffening ring. The second supporting assembly is located adjacent the first supporting assembly and includes a retractable supporting assembly for engaging an underside and an upper side of the forming and stiffening ring. The apparatus further includes a device for heating the marginal edge portion and a device for engaging the marginal edge portion after such heating for folding or rolling the marginal edge portion around the forming and stiffening ring and for holding the formed edge portion in place until material has cooled.

4 Claims, 6 Drawing Sheets

METHOD OF MANUFACTURING LAMPSHADES AND APPARATUS FOR PERFORMING THE METHOD

Figure 1:
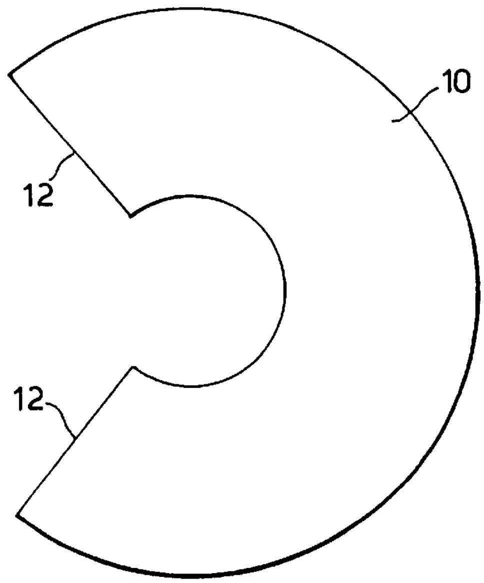

THIS INVENTION relates to the manufacture of lampshades, more particularly to the manufacture of a lampshade comprising a heat-deformable sheet material or fabric secured to a mounting frame adapted to be fitted, for example, to a standard electric lamp socket. Such a lampshade is herein referred to as being "of the kind specified".

Our European Patent Application No. 93307419.7, published as EP-A-0595461, incorporated herein by reference, discloses a method of and apparatus for manufacturing lampshades of the kind specified in which a strip or sector of heat-deformable sheet material has its ends temporarily connected to form a generally annular blank having upper and lower peripheral edges, after which the upper and lower edges are softened by heat and mechanically deformed to provide pockets to receive, respectively, an annular portion of the wire mounting frame and a lower stiffening ring, the temporarily connected ends of the blank being then separated to allow the extraction of the blank from the apparatus and to allow the introduction into these pockets of the respective mounting frame part and the stiffening ring. The ends of the blank are thereafter permanently secured together to afford the finished shade.

In fact, the need for separation of the ends of the lampshade blank for extraction from the apparatus and insertion of frame portions arises, the applicants have found, only in relation to the stiffening ring at the wider, (generally lower), end of the lampshade where the lampshade, as is conventionally the case, is narrower at the top than the bottom. The plastics material of the shade is generally sufficiently resilient to allow the annular portion of the mounting frame to be engaged in the pocket at the narrower, (generally upper), end of the lampshade blank simply by pushing the mounting frame annular portion into its pocket from within the lampshade blank without separating the connected ends of the blank. The frusto-conically or similarly tapering configuration of the lampshade, however, makes insertion of the stiffening ring at the lower, wider end of the shade, after forming the blank, impossible unless the ends of the blank are temporarily separated.

Our co-pending European Patent Application No. 95301083.2, likewise incorporated herein by reference, discloses variants of the apparatus and method of EP-A-0595461 in which the necessity for securing the ends of the blank together only temporarily in the first instance and for subsequently separating the ends of the blank for extraction from the apparatus and for insertion of the stiffening ring are avoided by forming the lower edge of the blank around the lower stiffening ring, temporarily held in place by retractable magnetic fingers.

It is an object of the present invention to provide an improved method of manufacturing lampshades of the kind specified in which separation of the joined ends of the lampshade blank after forming the pockets at the upper and lower ends of the lampshade, is unnecessary.

It is a further object of the invention to provide an improved apparatus for performing the method.

According to one aspect of the invention there is provided a method of manufacturing a lampshade from a heat-formable sheet material, comprising forming a blank of such sheet material into the form of a hollow body having upper and lower peripheral edges, holding the blank in this shape, locating a forming and stiffening ring within the hollow body and in engagement therewith adjacent a peripheral edge of the hollow body, supporting said stiffening ring by retractable supporting means engaging the underside and the upper side of the stiffening ring, heating said peripheral edge of said hollow body to a temperature at which it is formable, folding said heated edge around said forming and stiffening ring whereby the forming and stiffening ring is held captive within a cavity or pocket extending around the respective end of the blank, and allowing the material to cool.

According to another aspect of the invention there is provided apparatus for use in manufacturing a lampshade from a heat-deformable sheet material comprising means for supporting a hollow body formed from such sheet material and having upper and lower peripheral edges, the apparatus including supporting means for releasably supporting a forming and stiffening ring with said ring in peripheral engagement with the interior surface of said hollow body adjacent a said peripheral edge thereof, so that a marginal edge portion of said body projects beyond said forming and stiffening ring, said supporting means comprising retractable supporting means for engaging the underside and the upper side of the stiffening ring, means for heating such marginal edge portion, means for engaging said marginal edge portion after such heating and for folding or rolling it around said forming and stiffening ring and for holding the formed edge portion in place until the material has cooled.

Figure 2:
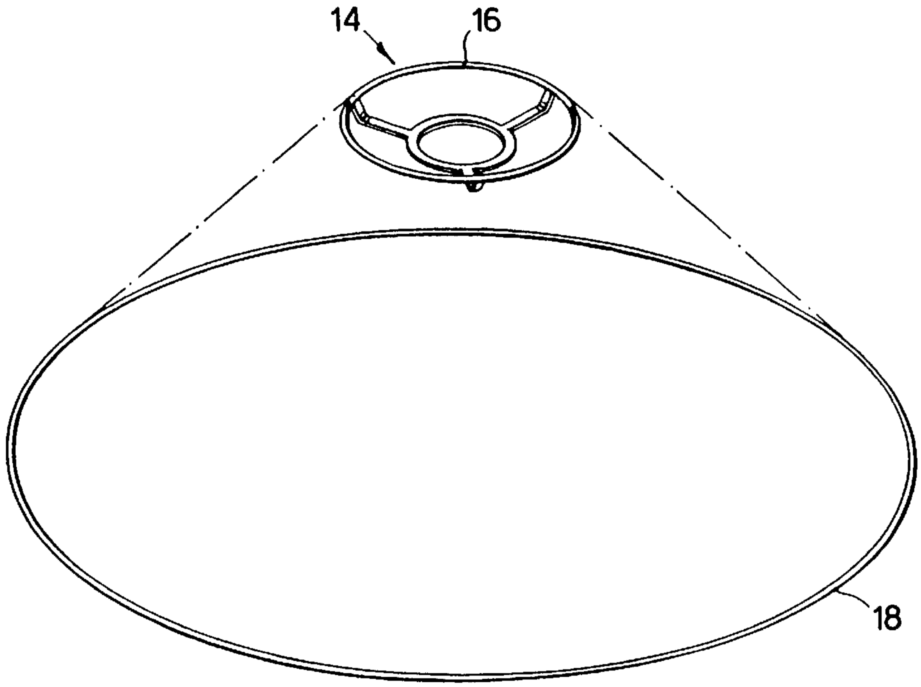
Figure 3:
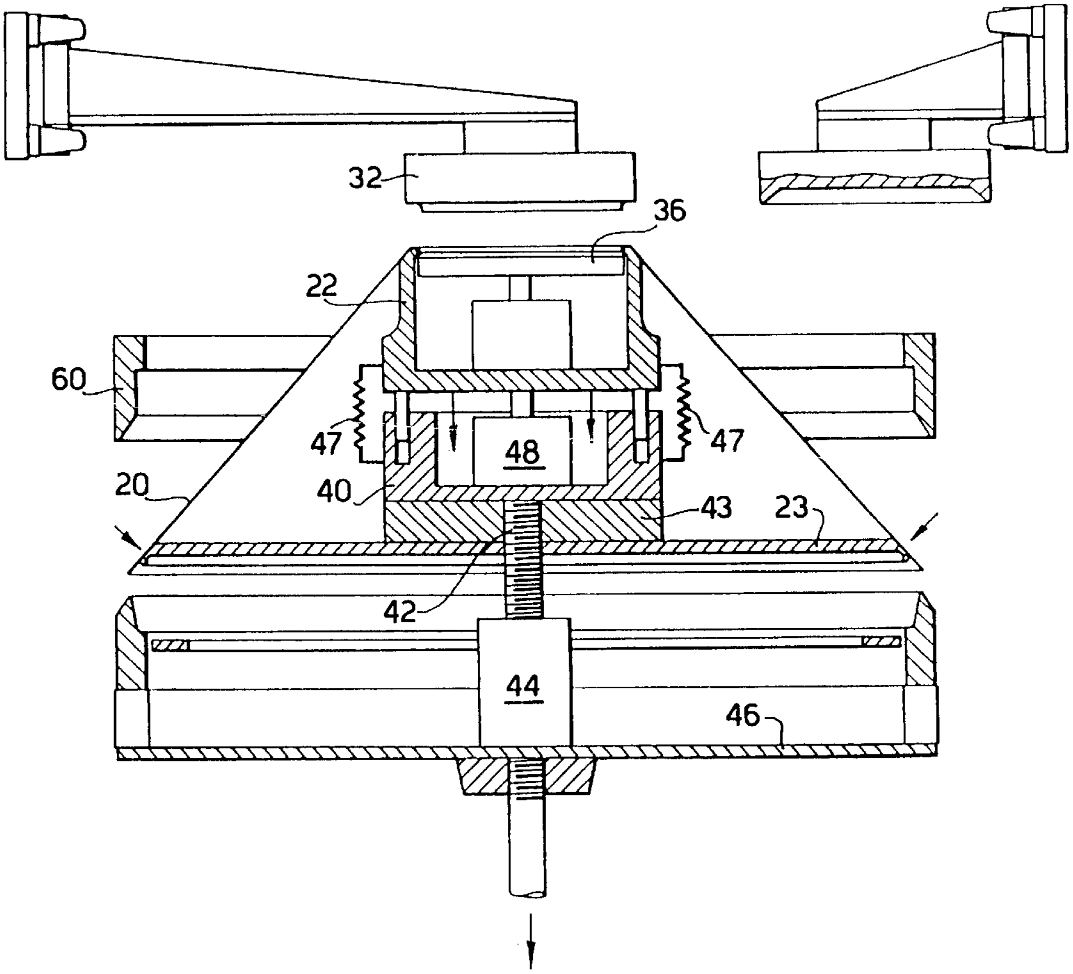
Figure 4:
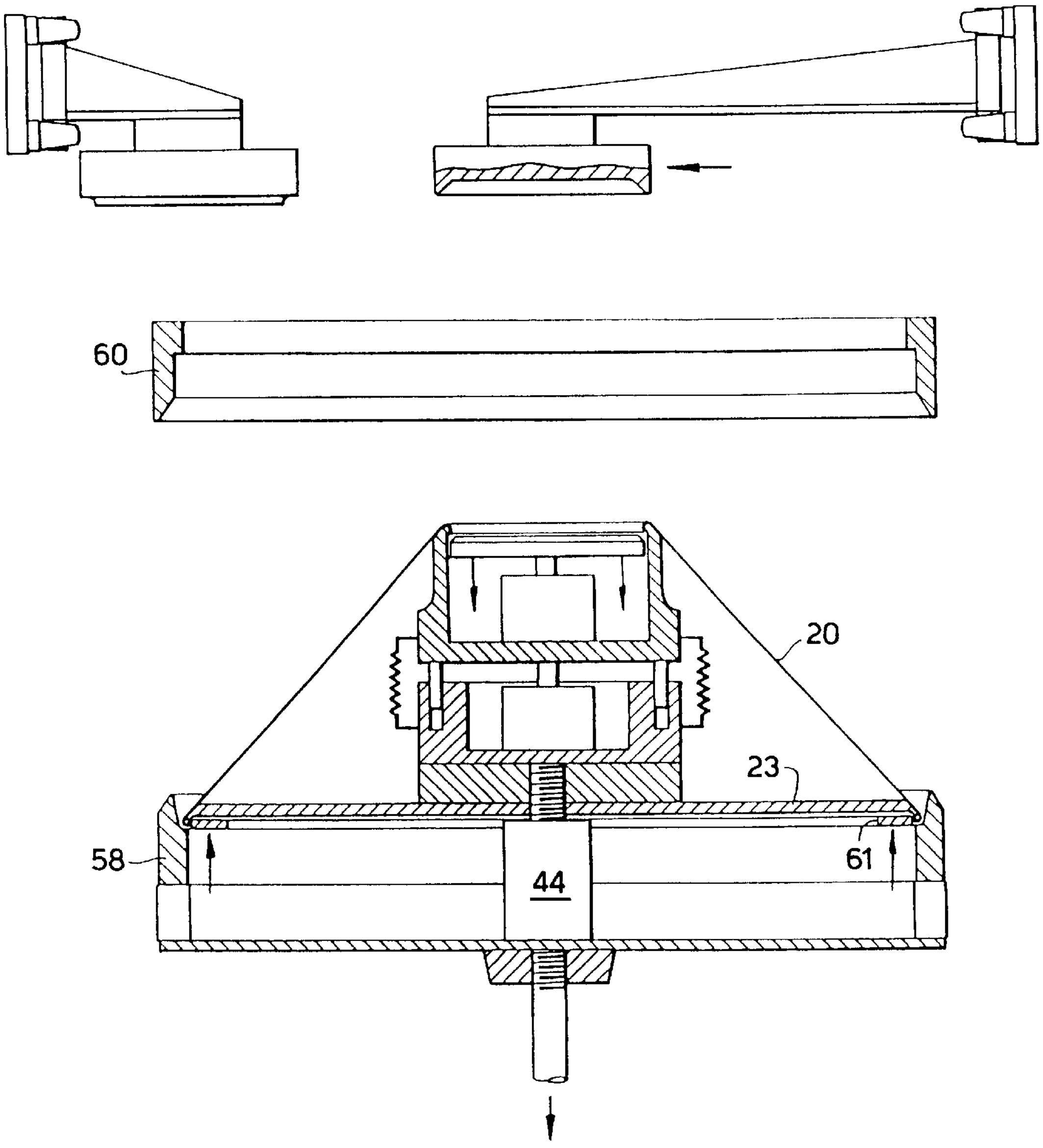
Figure 5:
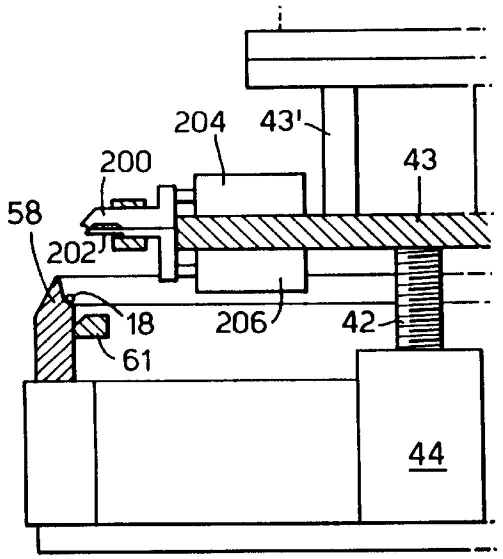

An embodiment of the invention is described below by way of example with reference to the accompanying drawings in which:

FIGS. 1 and 2 illustrate steps in a method of lampshade manufacture,

FIG. 3 illustrates the apparatus of EP0595461 at an intermediate stage in the forming of a lampshade, FIG. 4 illustrates the same apparatus at a later stage in the forming of the lampshade, and FIGS. 5 to 15 illustrate successive stages in the forming of a lampshade by a method embodying the present invention utilising apparatus in accordance with the present invention, FIGS. 5 to 15 being each a diagrammatic view in vertical axial section through the apparatus.

Referring to FIGS. 1 and 2, the manufacture of a lampshade, using a decorative fabric having, adhered to one face thereof, a dimensionally stable, flexible, heat-formable plastics sheeting, commences, as in conventional practice, with the cutting from such composite material, of a workpiece of the shape illustrated in FIG. 1. This workpiece is placed in a welding jig whilst being rolled into a conical configuration so that the opposite ends 12 of the workpiece overlap. The welding jig incorporates edge and end location stops such that the workpiece is held precisely in the shape of a hollow truncated cone 20 of predetermined dimensions. The overlapping edge portions are temporarily secured together by tack welds, whilst the workpiece is in the welding jig.

The intermediate product 20 thus formed, is then removed from the former. In the method described in EP0595461, the product 20 is then fitted into the apparatus shown in FIGS. 3 and 4.

Referring to FIGS. 3 and 4, there is shown the apparatus disclosed in EP0595461, with a lampshade blank 20 in place, at an intermediate stage, in which an upper edge of the lampshade blank has been formed around the upper annular edge of an upper former 22 using a top mould 32 and a clamping plate 36. The former 22 is movable axially vertically relative to a lower former plate 23 secured to a central body or plate 43 fixed to the upper end of a piston rod 42 of an actuator 44. The plate 23 has a downwardly facing peripheral bead. The upper former 22 is supported for vertical sliding movement on a support 40, which also carries the cylinder of an actuator 48. The former 22 is urged towards the lower former 23 by tension springs 47 and can be moved upwardly away from the plate 23 by means of the actuator 48.

As described in EP0595461, after the position shown in FIG. 3 is reached, the actuator 44, 42, is extended upwardly, after lateral removal of the top mould 32, to bring the lower edge of the blank 20 into cooperation with an upper annular heater 60 so that the projecting lower edge region of the blank 20 is softened and caused to adopt a substantially cylindrical form. The assembly, including the blank 20, and the upper and lower formers, is then lowered to bring the softened lower edge portion of the blank into cooperation with a lower annular heater 58 which has, at its upper end, a frusto-conical opening terminating in an inwardly extending ledge. Thus, as the assembly is lowered into the lower heater 58, the marginal softened lower edge portion of the blank is moulded around the periphery of plate 23 to project substantially radially inwardly therefrom. Thereafter, as shown in FIG. 4, a former ring 61 is moved upwardly to complete the folding of the lower edge portion around the peripheral bead of the plate 23 and to hold the marginal edge region against the underside of the plate 23 after the heaters 58 and 60 are removed from the region of the lower edge of the blank, until the lower marginal edge portion of the blank has cooled and hardened again. After the stage shown in FIG. 4 has been reached, in the process disclosed in EP-A-0595461, the edges 12 of the blank, which have been only temporarily secured together, are separated to allow the blank to be removed from the former plate 23 and to allow the lower stiffening ring 18 to be inserted into the pocket formed at the lower edge of the lampshade by deformation of the lampshade material around the peripheral edge of the former plate 23.

The applicants have found that it is, in fact, perfectly possible to separate the upper edge of the blank, deformed as shown in FIG. 3, from the upper former 22, simply by pulling the former 22 downwardly out of the upper end of the lampshade, without separating the edges 12 of the lampshade blank. Accordingly, the separation of the edges 12, previously temporarily secured together, can be avoided if the lower edge of the lampshade blank can be formed around the lower stiffening ring 18 in situ. The modification of the apparatus of EP-A-0595461 illustrated in FIGS. 5 to 15 allows this to be done.

In FIGS. 5 to 15, for convenience, only the part of the apparatus to the left side of the central vertical axis and a small adjoining portion of the apparatus on the right side of said axis are shown, it being understood that the apparatus, as in FIGS. 3 and 4, is substantially symmetrical about the vertical axis. In FIGS. 5 to 15, parts corresponding to parts in FIGS. 3 and 4 have corresponding references. In the apparatus of FIGS. 5 to 15, the plate 43 is of greater diametral extent than in FIGS. 3 and 4, but the plate 43 is nevertheless of substantially lesser diameter than the bottom ring 18 of the lampshade. A spacer structure, represented at 43', supports the support 40 for the actuator 48 (not shown in FIGS. 5 to 15) and the upper former 22 (not shown in FIGS. 5 to 15). The plate 43 carries a plurality of upper and lower fingers 200 and 202 respectively which extend outwardly from the periphery of the plate 43 and have associated actuators 204 and 206 respectively whereby the upper and lower fingers 200, 202 can be moved between retracted and projected positions in which the free ends of the fingers are respectively nearer to and further from the middle of the plate 43.

Preferably there are at least three upper fingers 200 spaced apart around the periphery of plate 43 and at least three lower fingers 202, likewise spaced apart around the periphery of the plate 43, although the number of upper and lower fingers 200, 202 could be greater (or, indeed, could be as low as two if the upper fingers were, for example, diametrally opposite and the lower fingers were diametrally opposite one another but spaced 90° from the upper fingers about the vertical axis of plate 43). Whilst, as shown in the drawings, each upper finger 200 may be paired with a respective lower finger 202 disposed directly below, this is not strictly necessary.

As shown in FIGS. 5 to 15, each upper finger 200 has, adjacent its free end, a substantially radially extending portion, from the radially outward end of which a downwardly inclined portion (inclined at approximately the same angle to the vertical as the conical surface of the lampshade blank), extends to the free end of the finger, where it is provided with a concave surface for close engagement with the complementarily convex surface of a round wire stiffening ring 18. In the arrangement shown, each lower finger 202 extends radially and horizontally to its free radially outer end, but is chamfered or bevelled at its free end so that the lower edge of said free end is radially further outward than the upper edge and provides a point.

Figure 6:
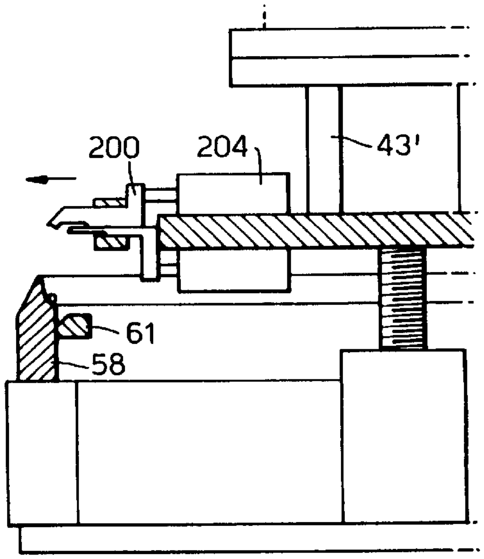
Figure 7:
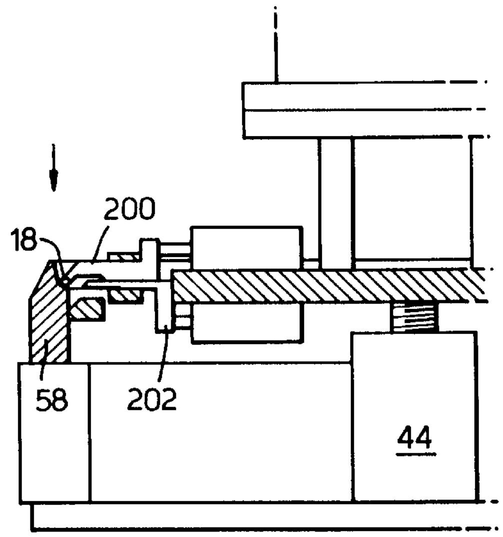
Figure 8:
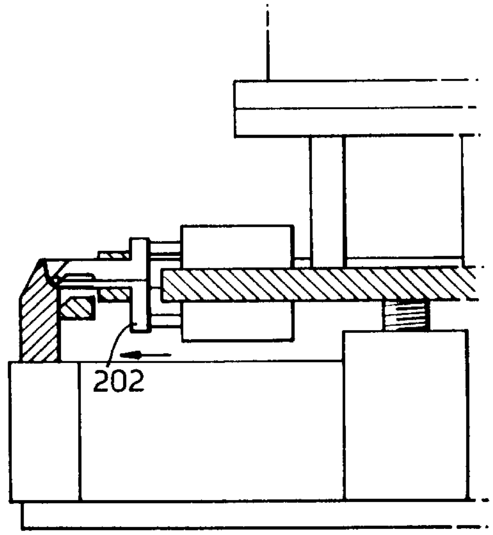
Figure 9:
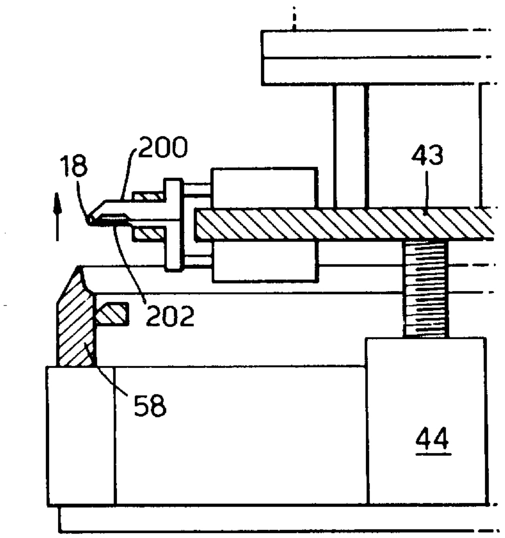
Figure 10:
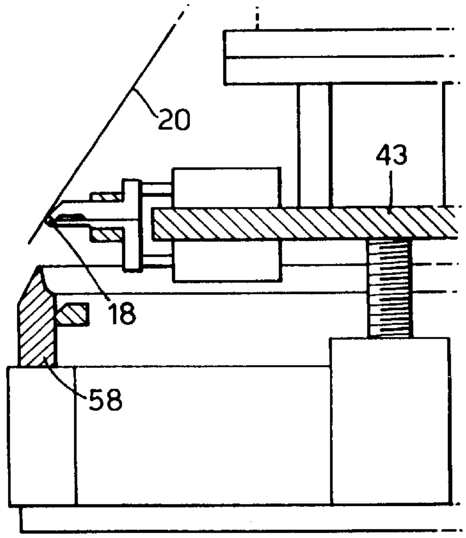
Figure 11:
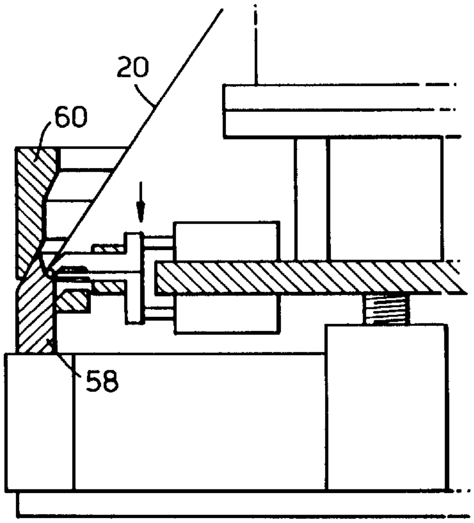

As illustrated in FIG. 6, the upper and lower fingers 200 and 202 are independently reciprocable by their respective actuators 204, 206. In use of the apparatus of FIGS. 5 to 15, the stiffening ring 18 may be laid in the recess at the upper end of the lower heater 58, so as to lie upon the horizontal ledge thereof, before the lampshade blank is fitted over the apparatus. FIGS. 5 to 8 illustrate how the ring 18, so located, may be picked up and retained by the fingers 200, 202. Thus, in the position shown in FIG. 5, the plate 43 is raised above the lower heater 58, with the fingers 200, 202, retracted radially inwardly. From this position, the upper fingers 200 are extended radially outwardly by the actuators 204, to outer limiting positions in which their free ends are directly above the ring 18 (FIG. 6). The fingers 202, on the other hand, are retained in their radially inner positions. By operation of the actuator 44, the plate 43, and with it the fingers 202, 200, is lowered to a position shown in FIG. 7 in which the free ends of the upper fingers 200 engage the ring 18 on the upper side thereof. The lower fingers 202 are then extended by their actuators 206, to the position shown in FIG. 8 in which the point of each finger 202 is engaged beneath the ring 18.

Figure 12:
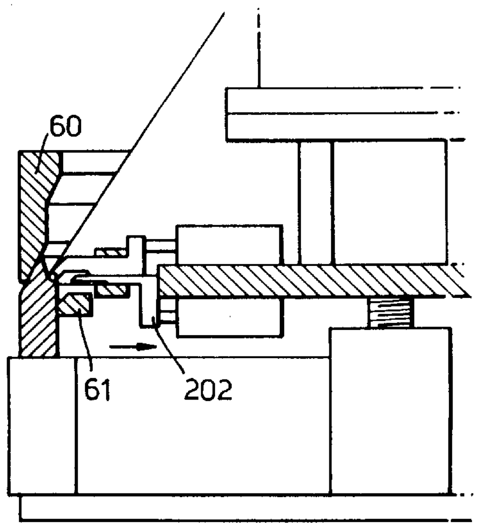

By operation of the actuator 44, the plate 43, with fingers 200, 202 is then raised in readiness for the fitting of the lampshade blank 20 over the apparatus and the plate 43 remains in this position during forming of the upper edge of the lampshade blank (not shown) in the manner described in EP-A-0595461. When the stage corresponding to that shown in FIG. 3 is reached, the projecting lower edge of the lampshade blank is brought into cooperation with the upper heater and is softened and deformed into a substantially downwardly depending cylindrical curtain and, as before, is then lowered, with the plate 43 (and, in this instance, with the ring 18 and upper and lower fingers 200, 202), into the cavity of the lower heater 58 whereby the softened free lower edge of the blank is bent around the ring 18 to extend, below the ring, substantially radially inwardly from the ring over the horizontal ledge of the lower heater 58. The lower fingers 202 are then retracted radially inwardly by their actuators as shown in FIG. 12 and a annular former 61, corresponding in function to the annular former 61 in FIG. 4, is raised to wrap the lower marginal edge portion of the lampshade material further around the ring 18, the marginal edge portion of the lampshade material forming an inner frusto-conical wall portion parallel with the outer frusto-conical surface of the lampshade blank, to define, with the outer surface, a relatively deep annular pocket into which the downwardly inclined outer ends of the fingers 200 extend. The upper surface of the former 61 may be provided with lateral slots to accommodate the lower fingers 202 or the lower fingers 202 may be capable of being retracted radially inwardly further than illustrated in FIG. 13 in order to be movable out of the path of the ring 51 entirely. It will be appreciated from FIGS. 11 to 15 that the upper heater 60 may be movable vertically (by means not shown) independently of the plate 43, with the heaters 60 and 58 being brought together, as shown in FIGS. 11 to 15, during softening and forming of the lower edge of the blank 20 around the ring 18.

Figure 13:
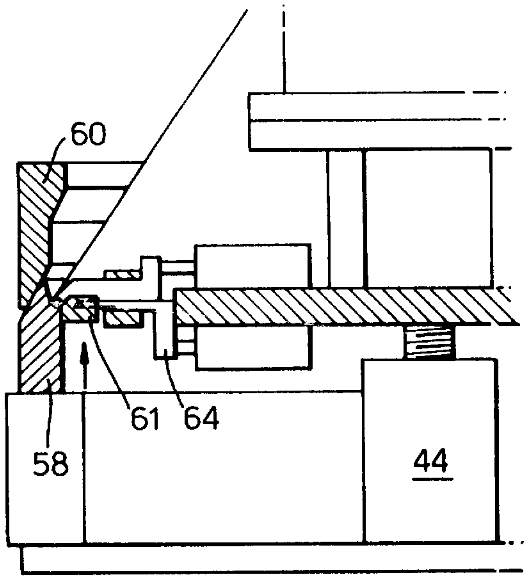
Figure 14:
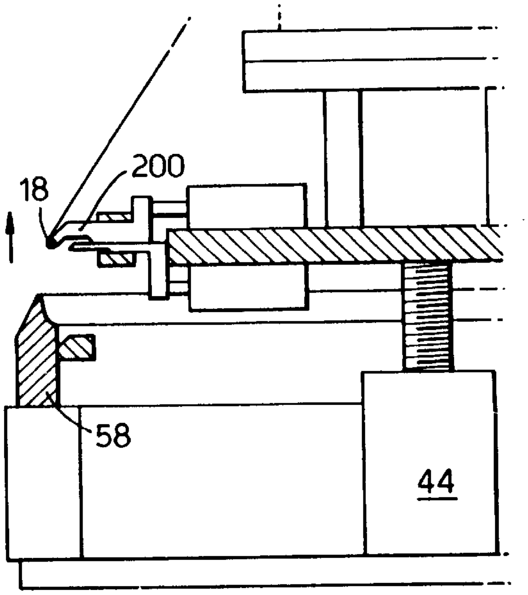
Figure 15:
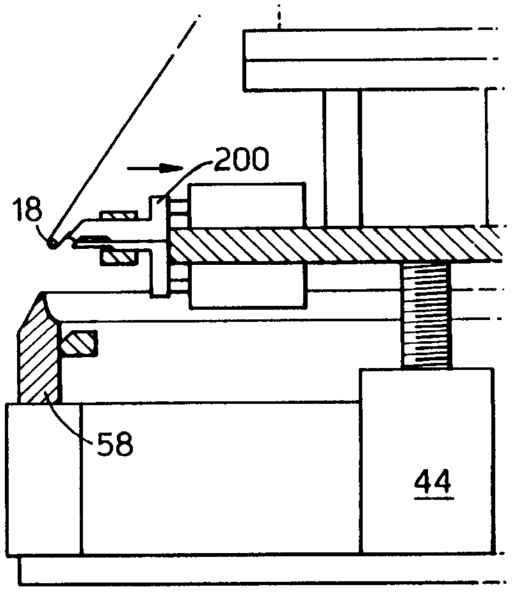

As shown in FIG. 14, after the position shown in FIG. 13 has been reached and after upward removal of the upper heater 60, the assembly comprising the plate 43, fingers 200, 202, blank 20 etc. may then be raised from the lower heater 58. If necessary, the former 61 may be raised with the assembly, out of the lower heater until the lower edge of the lampshade has cooled sufficiently to retain its form, whereafter the former 61 is lowered to its initial position, but in many cases the assembly can be lifted directly from the lower heater 58 and former 61.

Finally, when the marginal edge region of the lampshade has cooled sufficiently to be stable and rigid, the upper fingers 200 may be retracted radially inwardly (this being permitted by slight deflection of the inner wall of the annular pocket containing the ring 18 (resilient deflection), whereafter the workpiece may be lifted from the upper former and the mounting frame inserted upwardly from within the lampshade.

We claim:

1. An apparatus for manufacturing a lampshade from a heat-deformable sheet material, the apparatus comprising:

a first support means for supporting a hollow body formed from the heat-deformable sheet material, the hollow body having upper and lower peripheral edges;

a second supporting means for releasably supporting a forming and stiffening ring in peripheral engagement with an interior surface of the hollow body adjacent a peripheral edge thereof, so that a marginal edge portion of the hollow body projects beyond said forming and stiffening ring, said second supporting means carried on said first support means and comprising a central body and a retractable supporting means extensible and retractable from said central body for engaging an underside and an upper side of the forming and stiffening ring, a heater configured to heat the marginal edge portion, means for engaging the marginal edge portion after such heating and for folding or rolling the marginal edge portion around said forming and stiffening ring and for holding the formed edge portion in place until the heat-deformable sheet material has cooled.

2. The apparatus according to claim 1, including at least one actuator for extending and retracting the retractable supporting means with respect to said central body, wherein said retractable supporting means comprises a first retractable supporting member configured to enrage an underside of the forming and stiffening ring and a second, independently retractable supporting member configured to engage an upper side of the forming and stiffening ring, wherein said first retractable supporting member is retracted at an intermediate stage in the folding or rolling of the heated marginal edge portion around the forming and stiffening ring, whilst said second retractable supporting member is not retracted until the folding or rolling step has been substantially completed and thereafter can be retracted.

3. The apparatus according to claim 2, wherein said central body comprises a plate fixed to a piston rod of a vertical actuator operable to move said plate upwardly and downwardly relative to said first support means along a vertical axis, wherein said retractable supporting means comprises a plurality of upper and lower fingers which extend outwardly from a periphery of said plate, said fingers having associated actuators operable to move said fingers radially with respect to the vertical axis between retracted and extended positions, said upper fingers having lower surfaces configured to engage the upper side of said forming and stiffening ring and said lower fingers having upper surfaces configured to engage an underside of said forming and stiffening ring.

4. The apparatus according to claim 3, wherein the heater includes an annular heater coaxial with said first support means and second supporting means, the heater having at an upper end thereof a frusto-conical opening terminating in an inwardly extending ledge, wherein each said lower finger extends radially and horizontally to a radially outer free end thereof and is beveled at said free end so that a lower edge of said free end is radially further outward than an upper edge of said free end and provides a point for passing radially outwardly over the inwardly extending ledge and engaging under the forming and stiffening ring supported on the ledge.

* * * * *